United States Patent
Zhu et al.

(10) Patent No.: US 9,876,982 B2
(45) Date of Patent: *Jan. 23, 2018

(54) TEXT DETECTION IN VIDEO

(71) Applicant: Gracenote, Inc., Emeryville, CA (US)

(72) Inventors: Irene Zhu, San Francisco, CA (US); Wilson Harron, Berkeley, CA (US); Markus K. Cremer, Orinda, CA (US)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,719

(22) Filed: Apr. 23, 2015

(65) Prior Publication Data

US 2015/0350725 A1 Dec. 3, 2015

Related U.S. Application Data

(63) Continuation of application No. 14/289,142, filed on May 28, 2014, now Pat. No. 9,036,083.

(51) Int. Cl.
*H04N 5/445* (2011.01)
*H04N 21/858* (2011.01)
(Continued)

(52) U.S. Cl.
CPC ....... *H04N 5/445* (2013.01); *H04N 21/44008* (2013.01); *H04N 21/4722* (2013.01);
(Continued)

(58) Field of Classification Search
CPC ............ H40N 5/445; H40N 21/44008; H40N 21/8586; H40N 21/4788; H40N 21/4882; H40N 21/4722
(Continued)

(56) References Cited

U.S. PATENT DOCUMENTS 6,249,604 B1 6/2001 Huttenlocher et al.
6,532,302 B2 * 3/2003 Krtolica ............ G06K 9/00463
382/173
(Continued)

FOREIGN PATENT DOCUMENTS

WO WO-2015183914 A1 12/2015

OTHER PUBLICATIONS

"International Application Serial No. PCT/US2015/032618, International Search Report dated Aug. 27, 2015", 2 pgs.
(Continued)

*Primary Examiner* — Michael Lee
(74) *Attorney, Agent, or Firm* — McDonnell Boehnen Hulbert & Berghoff LLP

(57) ABSTRACT

Techniques of detecting text in video are disclosed. In some embodiments, a portion of video content can be identified as having text. Text within the identified portion of the video content can be identified. A category for the identified text can be determined. In some embodiments, a determination is made as to whether the video content satisfies at least one predetermined condition, and the portion of video content is identified as having text in response to a determination that the video content satisfies the predetermined condition(s). In some embodiments, the predetermined condition(s) comprises at least one of a minimum level of clarity, a minimum level of contrast, and a minimum level of content stability across multiple frames. In some embodiments, additional information corresponding to the video content is determined based on the identified text and the determined category.

20 Claims, 16 Drawing Sheets

(51) Int. Cl.
*H04N 21/44* (2011.01)
*H04N 21/4722* (2011.01)
*H04N 21/4788* (2011.01)
*H04N 21/488* (2011.01)

(52) U.S. Cl.
CPC ..... *H04N 21/4788* (2013.01); *H04N 21/4882* (2013.01); *H04N 21/8586* (2013.01)

(58) Field of Classification Search
USPC ........................................................ 348/563
See application file for complete search history.

(56) References Cited

U.S. PATENT DOCUMENTS

| | | |
|---|---|---|
| 6,608,930 B1 | 8/2003 | Agnihotri et al. |
| 6,614,930 B1 | 9/2003 | Agnihotri et al. |
| 7,876,381 B2 | 1/2011 | Kasano |
| 8,060,373 B2 | 11/2011 | Gibbon et al. |
| 9,036,083 B1* | 5/2015 | Zhu ........................ H04N 5/445 348/465 |
| 2003/0198386 A1 | 10/2003 | Luo |
| 2006/0083304 A1* | 4/2006 | Pan .................... G06F 17/3079 375/240.08 |
| 2007/0086669 A1 | 4/2007 | Berger et al. |
| 2009/0212113 A1* | 8/2009 | Chiu ........................ G06K 7/14 235/462.41 |
| 2010/0054585 A1* | 3/2010 | Guillou ................ G06K 9/3266 382/164 |
| 2013/0194448 A1 | 8/2013 | Baheti et al. |
| 2013/0330003 A1 | 12/2013 | Ivanchenko et al. |
| 2014/0188889 A1* | 7/2014 | Martens ............ G06F 17/30598 707/740 |

OTHER PUBLICATIONS

"International Application Serial No. PCT/US2015/032618, Written Opinion dated Aug. 27, 2015", 5 pgs.
"U.S. Appl. No. 14/289,142, Examiner Interview Summary dated dec. 1, 2014", 3 pgs.
"U.S. Appl. No. 14/289,142, Non Final Office Action dated Aug. 27, 2014", 6 pgs.
"U.S. Appl. No. 14/289,142, Notice of Allowance dated Jan. 21, 2015", 5 pgs.
"U.S. Appl. No. 14/289,142, Response filed Dec. 17, 2014 to Non Final Office Action dated Aug. 27, 2014", 10 pgs.
European Search Report, European Patent Application No. 15800068.7, dated Nov. 2, 2017, 7 pages.

* cited by examiner

TEXT DETECTION IN VIDEO

RELATED APPLICATIONS

This application is a continuation of U.S. patent application Ser. No. 14/289,142, filed May 28, 2014, which is incorporated herein by reference in its entirety.

TECHNICAL FIELD

The present application relates generally to the technical field of data processing, and, in various embodiments, to methods and systems of detecting text in video.

BACKGROUND

Video content, such as television programs, movies, and commercials, sometimes include text. This text can be informative and useful to the viewer. However, the viewer has limited options in terms of consuming the text. For example, the viewer typically has little choice other than to write the text down for later use.

BRIEF DESCRIPTION OF THE DRAWINGS

Some embodiments of the present disclosure are illustrated by way of example and not limitation in the figures of the accompanying drawings, in which like reference numbers indicate similar elements, and in which.

DETAILED DESCRIPTION

Figure 1:
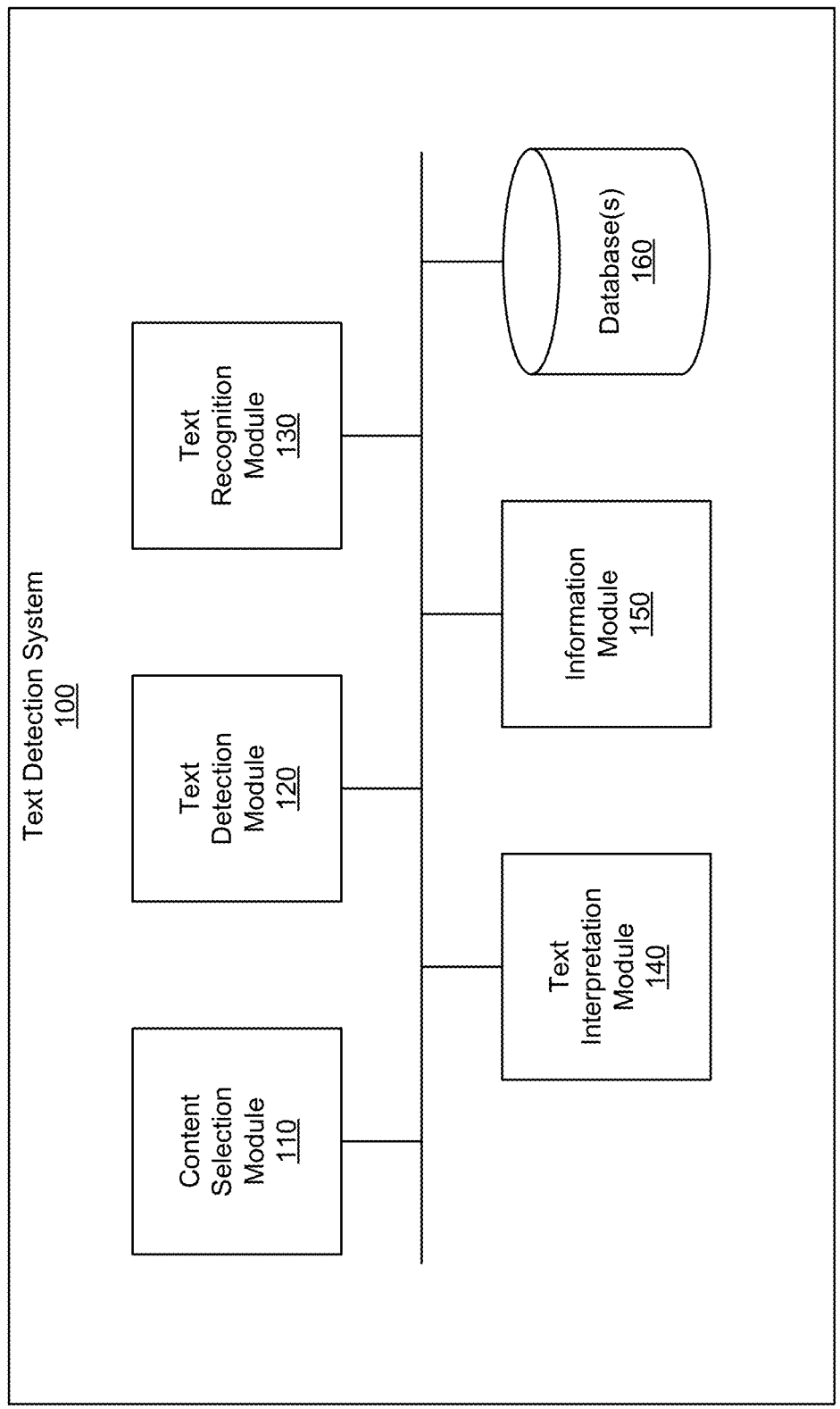
FIG. 1 is a block diagram illustrating a text detection system, in accordance with some example embodiments.

Example methods and systems of detecting text in video are disclosed. In the following description, for purposes of explanation, numerous specific details are set forth in order to provide a thorough understanding of example embodiments. It will be evident, however, to one skilled in the art that the present embodiments can be practiced without these specific details.

As will be disclosed herein, a text detection system can be configured and used to efficiently recognize overlaid text in video content. The text can be analyzed and identified as referring to information or sources of information, including, but not limited to, a uniform resource locator (URL), an identification of a user account (e.g., a Twitter® handle), a metadata tag (e.g., a hashtag), and a phone number. The results of this analysis (e.g., the identified text, information, and/or sources of information) can be stored in a database and/or provided to a software application on a media content device.

In some embodiments, a portion of video content is identified as having text. Text within the identified portion of the video content can be identified. A category for the identified text can be determined.

In some embodiments, a determination is made as to whether the video content satisfies at least one predetermined condition, and the portion of video content is identified as having text in response to a determination that the video content satisfies the predetermined condition(s). In some embodiments, the predetermined condition(s) comprises at least one of a minimum level of clarity, a minimum level of contrast, and a minimum level of content stability across multiple frames.

In some embodiments, additional information corresponding to the video content is determined based on the identified text and the determined category. The additional information can be caused to be displayed on a media content device. The additional information can be stored in association with the video content or in association with an identified viewer of the video content. The additional information can be provided to a software application on a media content device. The additional information can comprise at least one of a uniform resource locator (URL), an identification of a user account, a metadata tag, and a phone number. The media content device can comprise one of a television, a laptop computer, a desktop computer, a tablet computer, and a smartphone. The identified text can be stored in association with the video content or in association with an identified viewer of the video content.

In some embodiments, identifying the portion of the video content having text comprises converting a frame of the video content to grayscale, performing edge detection on the frame, performing dilation on the frame to connect vertical edges within the frame, binarizing the frame, performing a connected component analysis on the frame to detect connected components within the frame, merging the connected components into a plurality of text lines, refining the plurality of text lines using horizontal and vertical projections, filtering out at least one of the plurality of text lines based on a size of the at least one of the plurality of text lines to form a filtered set of text lines, binarizing the filtered set of text lines, and filtering out at least one of the text lines from the binarized filtered set of text lines based on at least one of a shape of components in the at least one of the text lines and a position of components in the at least one of the text lines to form the portion of the video content having text. In some embodiments, the step of filtering out at least one of the plurality of text lines based on a size of the at least one of the plurality of text lines to form a filtered set of text lines can be left out of the process. For example, if it is determined that all of the text lines meet a predetermined criteria, then this filtering step can be avoided.

In some embodiments, identifying text within the identified portion of the video content comprises performing optical character recognition on the identified portion of the video content.

In some embodiments, determining the category for the identified text comprises parsing the identified text to determine a plurality of segments of the identified text, and determining the category based on a stored association between at least one of the plurality of segments and the category.

In some embodiments, the video content comprises a portion of a television program, a non-episodic movie, a webisode, user-generated content for a video-sharing website, or a commercial.

The methods or embodiments disclosed herein can be implemented as a computer system having one or more modules (e.g., hardware modules or software modules). Such modules can be executed by one or more processors of the computer system. The methods or embodiments disclosed herein can be embodied as instructions stored on a machine-readable medium that, when executed by one or more processors, cause the one or more processors to perform the instructions.

FIG. 1 is a block diagram illustrating a text detection system 100, in accordance with an example embodiment. In some embodiments, the text detection system 100 comprises a content selection module 110, a text detection module 120, a text recognition module 130, a text interpretation module 140, an information module 150, and one or more databases 160.

In some embodiments, the text detection module 120 is configured to identify a portion of video content as having text. Identifying a portion of the video content as having text can comprise identifying a location of text within the video content. Techniques for identifying a portion of video content as having text will be discussed later in this disclosure. The video content can comprise a portion of a television program, a non-episodic movie, a webisode, user-generated content for a video-sharing website (e.g., YouTube®), or a commercial. Other types of video content are also within the scope of the present disclosure. The video content can comprise one or more frames of video content.

Processing frames of video content, such as by identifying a portion of the video content as having text, can be expensive both computationally and monetarily. The present disclosure introduces techniques for reducing this expense. In some embodiments, the content selection module 110 is configured to perform a pre-analysis of frames to identify frames that are likely to contain text. The text detection features disclosed herein can then be performed on these identified frames, while the frames determined to be unlikely to contain text can be omitted from the text detection process, thereby reducing expenses. The pre-analysis referred to above can comprise an analysis of global and local contrast, blurriness, global and local motion, and other features of the frames. In order for humans to read text easily, the text is typically a certain size, has good contrast (e.g., white on black, black on white, bright against dark, etc.), and is fairly static across multiple frames. Also, as the intent from the producers of the video content is for people to see and read the text, there generally is not too much local or global motion in the image, as such motion distracts eyeballs from the text. These guidelines can be used to identify likely candidates for further analysis in the text detection techniques described herein.

In some embodiments, the content selection module 110 is configured to make a determination as to whether video content satisfies at least one predetermined condition. The text detection module 120 can perform its operations on the video content for which a positive determination is made by the content selection module 110 in order to identify one or more portions of the video content as having text, while video content for which a negative determination is made can be omitted from such operations. In some embodiments, the predetermined condition(s) comprises at least one of a minimum level of clarity, a minimum level of contrast, and a minimum level of content stability across multiple frames. Other predetermined conditions are also within the scope of the present disclosure.

Once frames that are likely to contain text have been identified, they can be used to filter out remaining motion and noise, such as by averaging across multiple frames. In some embodiments, the resolution can be increased by interpolation of consecutive frames, thereby allowing for better discrimination of text.

In most written languages, certain structural directions are dominant. For example, in Latin letters, these directions are horizontal and vertical lines. This concept can be exploited by the text detection module 120 to further narrow in on regions of interest. Also, the same rules and conditions (e.g., contrast, blurriness, motion) discussed herein for the determination of presence of text in frames can be used here to identify regions of interest within frames.

In some embodiments, the text recognition module 130 is configured to identify text within the identified portion of the video content. Identifying text within the identified portion of the video content can comprise performing OCR on the identified portion of the video content. Other techniques of identifying text within the identified portion of the video content are also within the scope of the present disclosure.

In some embodiments, the text recognition module 130 is configured to determine a category for the identified text. Examples of categories include, but are not limited to, URL, identification of a user account, metadata tag, and phone number. Other types of categories are also within the scope of the present disclosure. Determining the category for the identified text can comprise parsing the identified text to determine a plurality of segments of the identified text, and then determining the category based on a stored association between at least one of the segments and the category. The association can be stored in database(s) 160. In some embodiments, the association can comprise a rule for determining to which category a segment of text corresponds. In one example, the text "www.examplewebsite.com" can be displayed over video content of a television program. The text recognition module 130 can determine that this text refers to a website based on the use of "www." or ".com", or can determine that this text refers to a website based on a matching of the text "www.examplewebsite.com" with the same text (e.g., "www.examplewebsite.com") or similar text (e.g., "examplewebsite.com") stored in the database(s) 160. In some embodiments, the text recognition module 130 can determine the category based on accessing a lookup table of corresponding text and categories. The identified text can be stored in association with the video content or in association with an identified viewer of the video content. The stored text can then be accessed, retrieved, and used in further processing, as will be discussed in further detail below.

In some embodiments, the information module 150 is configured to determine additional information corresponding to the video content based on the identified text and the determined category. The additional information can comprise at least one of a uniform resource locator (URL), an identification of a user account (e.g., a Twitter ® handle), a metadata tag (e.g., a hashtag), and a phone number. The additional information can be stored in association with the video content or in association with an identified viewer of the video content. A history of the additional information (e.g., links and references) can be maintained in database(s) 160 or on a media content device to allow for a user (e.g., the viewer) to follow up on and/or do further research using the additional information. In some embodiments, a media content device can comprise any electronic device configured to play media content, such as video content and/or audio content. Examples of media content devices include, but are not limited to, televisions, laptop computers, desktop computers, tablet computers, smartphones, gaming devices, and/or other devices capable of receiving and presenting audio, video, and/or other multimedia content.

The additional information can be provided to a software application on a media content device. The additional information can also be caused to be displayed on a media content device. For example, in response to the detection of text corresponding to a link, the link can be automatically loaded on a software application (e.g., a browser) to display a page (e.g., a web page) corresponding to the video content or the detected text within the video content. In another example, an Internet search or a search of a specific service for specific keywords can automatically be performed based on the identified text, the determined category, and/or the determined additional information. For example, in response to names being detected in the closing credits of a television program (or some other video content), a search can automatically be performed using the detected names to compile information about the people (e.g., actors, actresses, other contributors) corresponding to those names. In some embodiments, certain predefined indications can be used to identify an action to be taken regarding the detected text or determined additional information, such as a keyword or a symbol. For example, in the example above, the word "cast" detected in the end credits of the video content can be used to provide context and meaning for the detected names that follow the word "cast." One or more operations corresponding to the determined context and meaning can then be performed. Based on a determination that detected text corresponds to names of cast members of video content, the names can be searched using a service (e.g., IMDb®). The search can provide additional information corresponding to the names, such as fictional characters corresponding to the names of the actors/actresses. Any combination of one or more of the detected text, determined categories, and determined additional information can be stored in database(s) 160 in association with the corresponding video content and/or in association with a user, such as the corresponding viewer of the corresponding video content.

Figure 2:
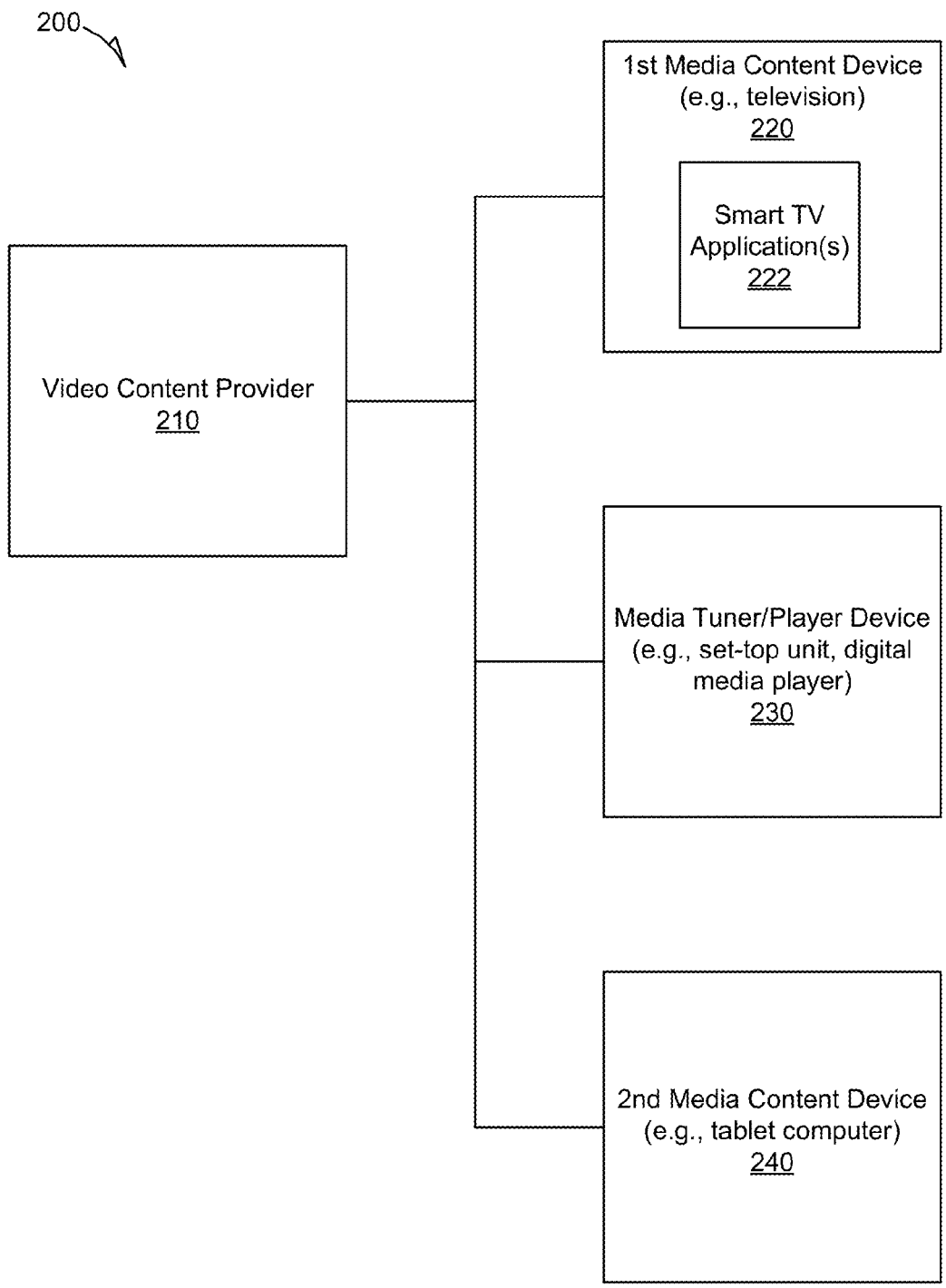
FIG. 2 is a block diagram illustrating an environment in which features of a text detection system can be implemented, in accordance with some example embodiments.

FIG. 2 is a block diagram illustrating an environment 200 in which features of the text detection system 100 can be implemented, in accordance with an example embodiment. The text detection system 100 can be configured to provide the text detection features disclosed herein to a video content provider 210, a media content device, such as first media content device 220 or second media content device 240, and/or a media tuner/player device 230.

The video content provider 210 can comprise a computer system configured to provide video content to media content devices. In some embodiments, the video content provider 210 comprises a broadcaster of video content (e.g., a cable television broadcaster, a satellite radio broadcaster, a webcaster). As previously discussed the video content can comprise a television program, a non-episodic movie, a webisode, user-generated content for a video-sharing website, or a commercial. Other types of video content are also within the scope of the present disclosure.

In some embodiments, first media content device 220 and the second media content device 240 are configured to play video content. In some embodiments, the first media content device 220 comprises a smart television. Accordingly, the first media content device 220 can comprise one or more smart TV applications 222 (e.g., Netflix® or Hulu®) to enable the playing of Internet-based and on-demand media content. Other configurations are also within the scope of the present disclosure. In some embodiments, the second media content device 240 can be used concurrently with the first media content device 220 in a variety of ways. In some embodiments, the second media content device 240 can be used as a remote control to control the first media content device 220. In some embodiments, the second media content device 240 can be used to view additional information corresponding to video content being presented on the first media content device 220.

In one example, a user can be viewing a television commercial on the first media content device 220, while holding the second media content device 240. The television commercial can contain text, which can be detected and interpreted by the text detection system 100, as disclosed herein. The text detection system can determine additional information based on the detected text, such as a URL corresponding to the television commercial (e.g., a website for a product being advertised in the commercial). The text detection system 100 can provide the additional information to the second media content device 240 for presentation or further processing on the second media content device 240. In the example of the additional information comprising a URL, the URL can be caused to be launched on a web browser of the second media content device 240, thereby enabling the user to view additional information about the product of the commercial. In some embodiments, a phone number can be detected within the video content by the text detection system 100, and then the text detection system 100 can automatically provide a prompting on a mobile device (e.g., smartphone) of the user to ask the user if he or she wants to call the phone number. Other examples and configurations are also within the scope of the present disclosure.

In some embodiments, a media content device can employ a media tuner/player device 230 configured to receive a stream of video and/or audio content from a content provider (e.g., cable or satellite television providers, web television providers, terrestrial or satellite radio stations, online music services, etc.) and play the stream of content by processing the stream and outputting information (e.g., digital or analog) usable by a display of the media content device to present or play back the video and/or audio content to a user employing the media content device. Examples of media tuner/player devices 230 include, but are not limited to, a set-top unit (e.g., a cable box) and a digital media player (e.g., an Apple TV® player or a Roku® player). In some embodiments, the media tuner/player device 230 can be separate and external from the media content device that is employing its services. In other embodiments, the media tuner/player device 230 can be integrated into the media content device that is employing its services.

The devices and systems disclosed herein can communicate with other devices and systems in a variety of ways. In some embodiments, the devices and systems can communicate via one or more networks. Examples of networks that can be used include, but are not limited to, a wired network, a wireless network (e.g., a mobile network or a Wi-Fi network), a radio or telecommunications network, a satellite network, a cable network, and so on. In some embodiments, the network can include one or more portions that constitute a private network (e.g., a cable television network or a satellite radio network), a public network (e.g., over-the-air broadcast channels or the Internet), and so on. Other configurations and ways of communicating information between devices and systems are also within the scope of the present disclosure.

In some embodiments, the detected text, determined category, and/or the determined additional information can be stored in database(s) 160 in association with a user account. Each user account can be associated with and correspond to a particular media content device, a particular person, and/or a particular group of people. For example, one user account can correspond to a specific television set in a family's living room. In another example, another user account can correspond to one specific member of the family, no matter what media content device he or she is using. In this respect, the terms "user account" and "account of a user" can refer to an account of a specified user, an account of a specified group of specified users (e.g., family members), or an account of one or more specified devices (e.g., the family's kitchen TV), and should not be interpreted to be limited to only an account that belongs to a single specific user unless explicitly recited in the claims.

Each user account can comprise a history of what text has been detected within video content presented on a media content device corresponding to the user account and/or what text has been detected within video content viewed by a person corresponding to the user account. Furthermore, each user account can comprise a history of the categories and/or additional information corresponding to the detected text. Any combination of one or more of these histories can be accessed and viewed by a user for later reference or accessed automatically by a software application for use in presenting additional information corresponding to detected text to a user associated with the corresponding user account. For example, a user can watch a television program on the first media content device 220. During the television program, text containing a URL for the television program's website can be displayed. The URL can be detected by the text detection system 100 and stored in association with the user. A few days later, after the television program has long since ended, the user can be using a web browser on the second media content device 240, and the text detection system 100 can cause the web browser to automatically load the URL for the television program's website. Other examples and configurations are also within the scope of the present disclosure.

In some embodiments, the text detection system 100, or any combination of one or more of its components (e.g., modules and/or databases), can reside on or be integrated into any one of the video content provider 210, the first media content device 220, the media tuner/player device 230, and the second media content device 240. In some embodiments, the components of the text detection system 100 can all be implemented on one of the video content provider 210, the first media content device 220, the media tuner/player device 230, and the second media content device 240. In other embodiments, the different components of the text detection system 100 can be spread across different devices and systems (e.g., the text detection module 120 being integrated into the video content provider 210, and the text recognition module 130, the text interpretation module 140, and the information module 150 being integrated into the second media content device 240). Other configurations are also within the scope of the present disclosure.

In some embodiments, the text detection system 100, or some of its components, can be incorporated in a client device, such as the media content devices 220, 240 or the media player/tuner device 230 previously discussed. In some embodiments, the text detection system 100, or some of its components, can be incorporated in a server system, where broadcast feeds are analyzed in real-time, and client devices then retrieve the extracted information using identification methods (e.g., fingerprinting, watermarking).

In one example embodiment, a second screen device (e.g., a tablet or a smartphone) can use audio fingerprinting to identify a show that is being viewed by a user on a TV, and then pull information related to that show to the second screen device. That information can be compiled using text overlays on the opening credits of the show. Examples of such information can include social media links (e.g., a Facebook® or Twitter® link). However, other types of information are also within the scope of the present disclosure.

FIGS. 3A-3I illustrate different stages of detecting and interpreting text 320 in a frame 300 of video content 310, in accordance with some example embodiments. The stages of FIGS. 3A-3H correspond to identifying the portion of the video content having text, while FIG. 3I corresponds to identifying text within the identified portion of the video content, as well as determining a category for the identified text.

Figure 3A:
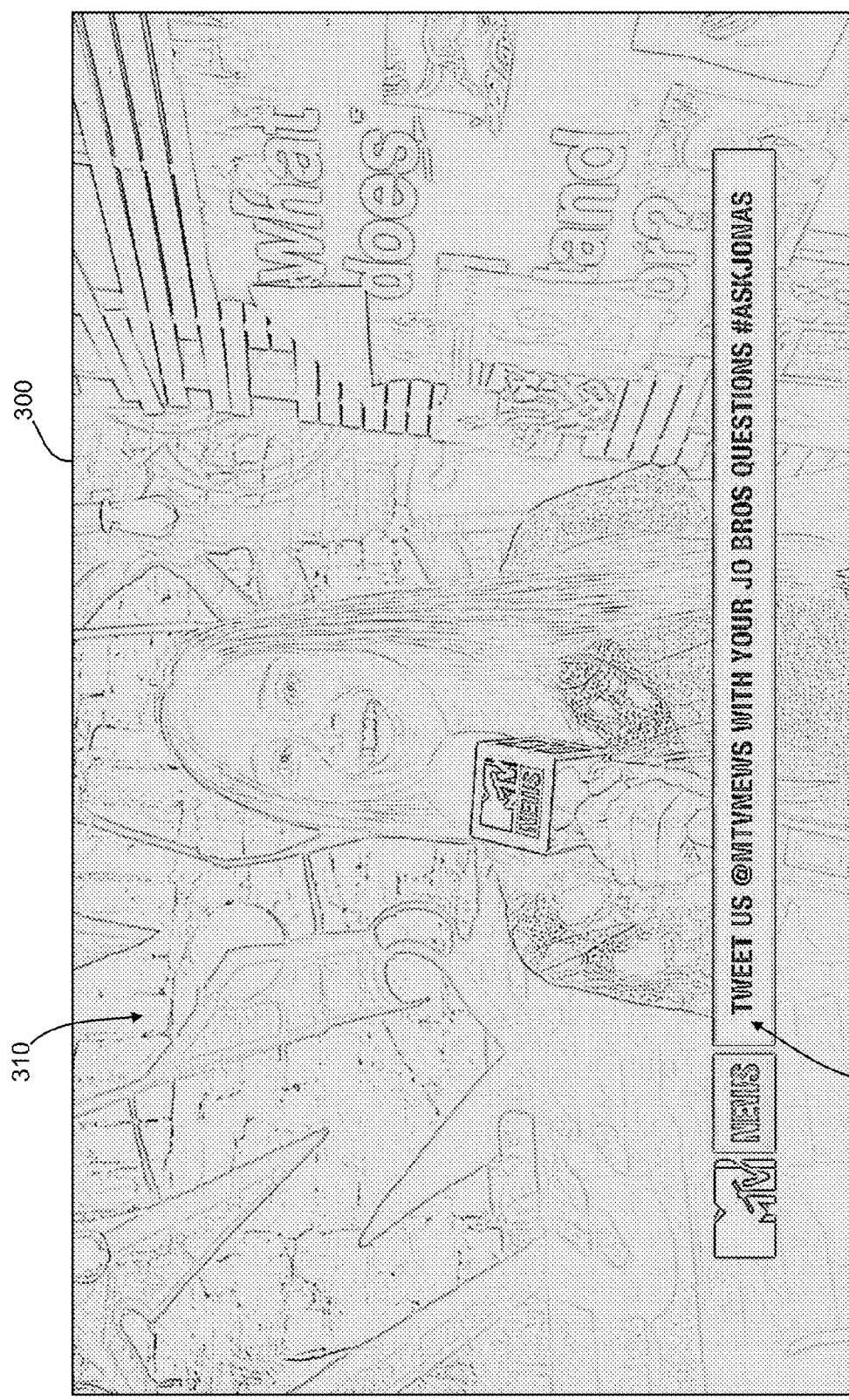
FIGS. 3A-3I illustrate different stages of detecting and interpreting text in a frame of video content, in accordance with some example embodiments.

FIG. 3A shows the frame 300 of video content 310 having a variety of text 320 in different locations. In some embodiments, the frame 300 can be converted to grayscale. Edge detection can then be performed on the converted frame 300. Edge detection is the name for a set of mathematical methods which aim at identifying points in a digital image at which the image brightness changes sharply or has discontinuities. In some embodiments, a Sobel filter or operator can be used with the edge detection. The Sobel operator is a discrete differentiation operator, computing an approximation of the gradient of the image intensity function. At each point in the image, the result of the Sobel operator is either the corresponding gradient vector or the norm of this vector.

In some embodiments, dilation on the frame 300 can be performed to connect vertical edges within the frame 300. The basic effect of the dilation on a binary image is to gradually enlarge the boundaries of regions of foreground pixels. Thus, areas of foreground pixels grow in size, while holes within those regions become smaller.

In some embodiments, the frame 300 can then be binarized. The frame can be binarized using Otsu's method. Otsu's method is used to automatically perform clustering-based image thresholding or, the reduction of a graylevel image to a binary image. The algorithm assumes that the image to be thresholded contains two classes of pixels or bi-modal histogram (e.g., foreground and background), then calculates the optimum threshold separating those two classes so that their combined spread (intra-class variance) is minimal.

In some embodiments, a connected component analysis can then be performed on the frame 300 to detect connected components within the frame 300. Connected component analysis is an algorithmic application of graph theory, where subsets of connected components are uniquely labeled based on a given heuristic. Connected component analysis is used in computer vision to detect connected regions in binary digital images, although color images and data with higher dimensionality can also be processed. A graph, containing vertices and connecting edges, is constructed from relevant input data. The vertices contain information required by the comparison heuristic, while the edges indicate connected 'neighbors'. An algorithm traverses the graph, labeling the vertices based on the connectivity and relative values of their neighbors. Following the labeling stage, the graph can be partitioned into subsets, after which the original information can be recovered and processed.

Figure 3B:
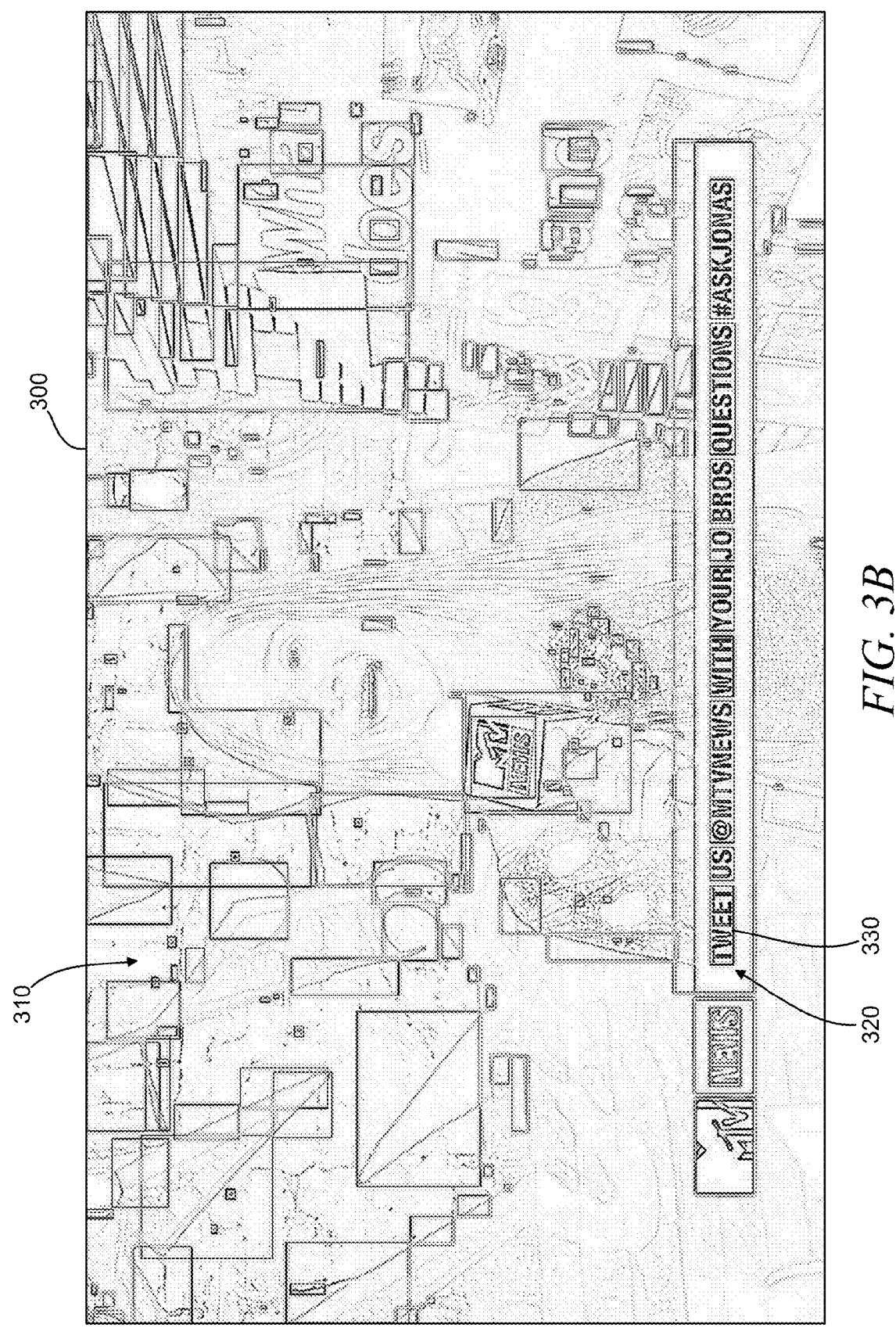
Figure 3C:
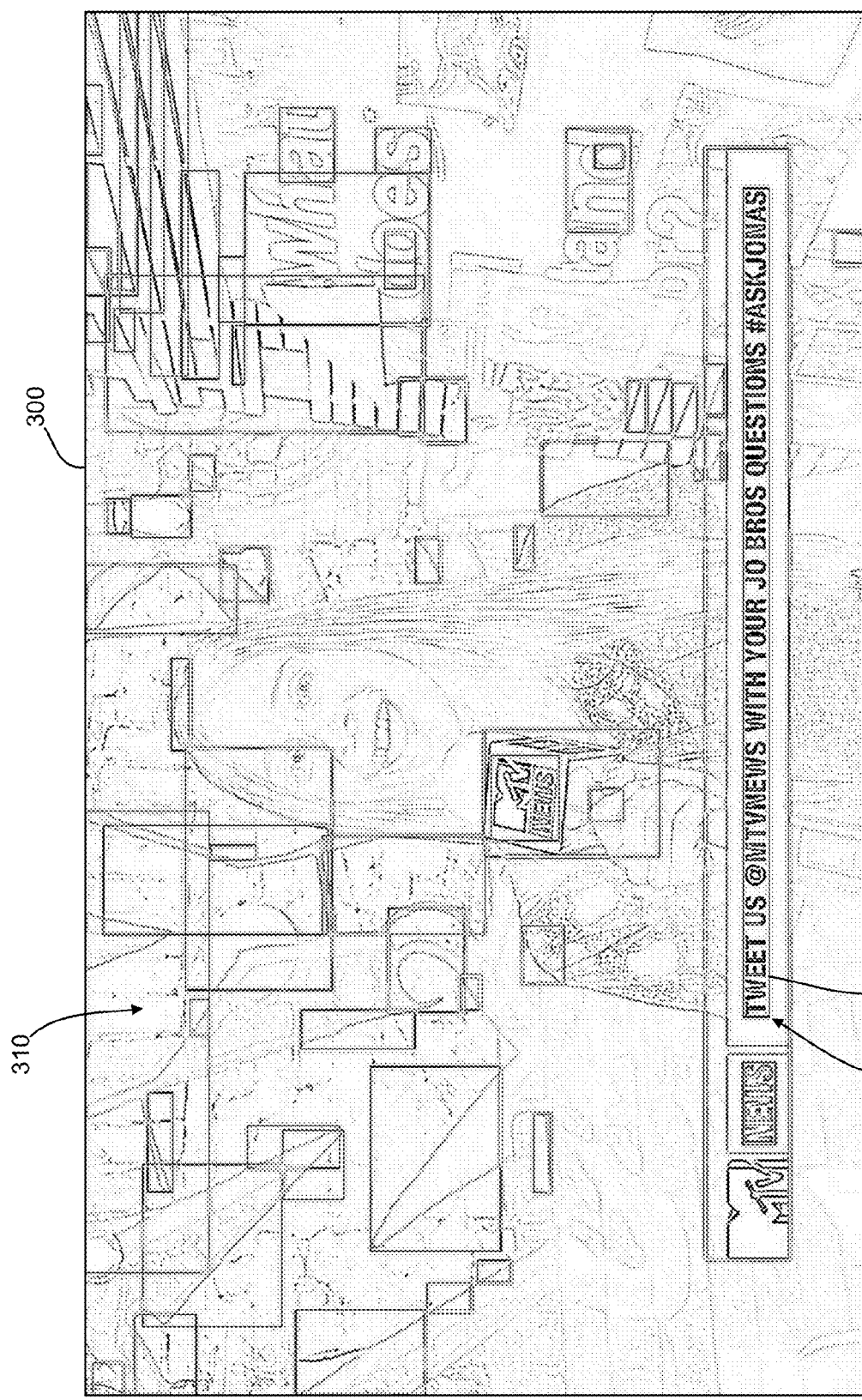
Figure 3D:
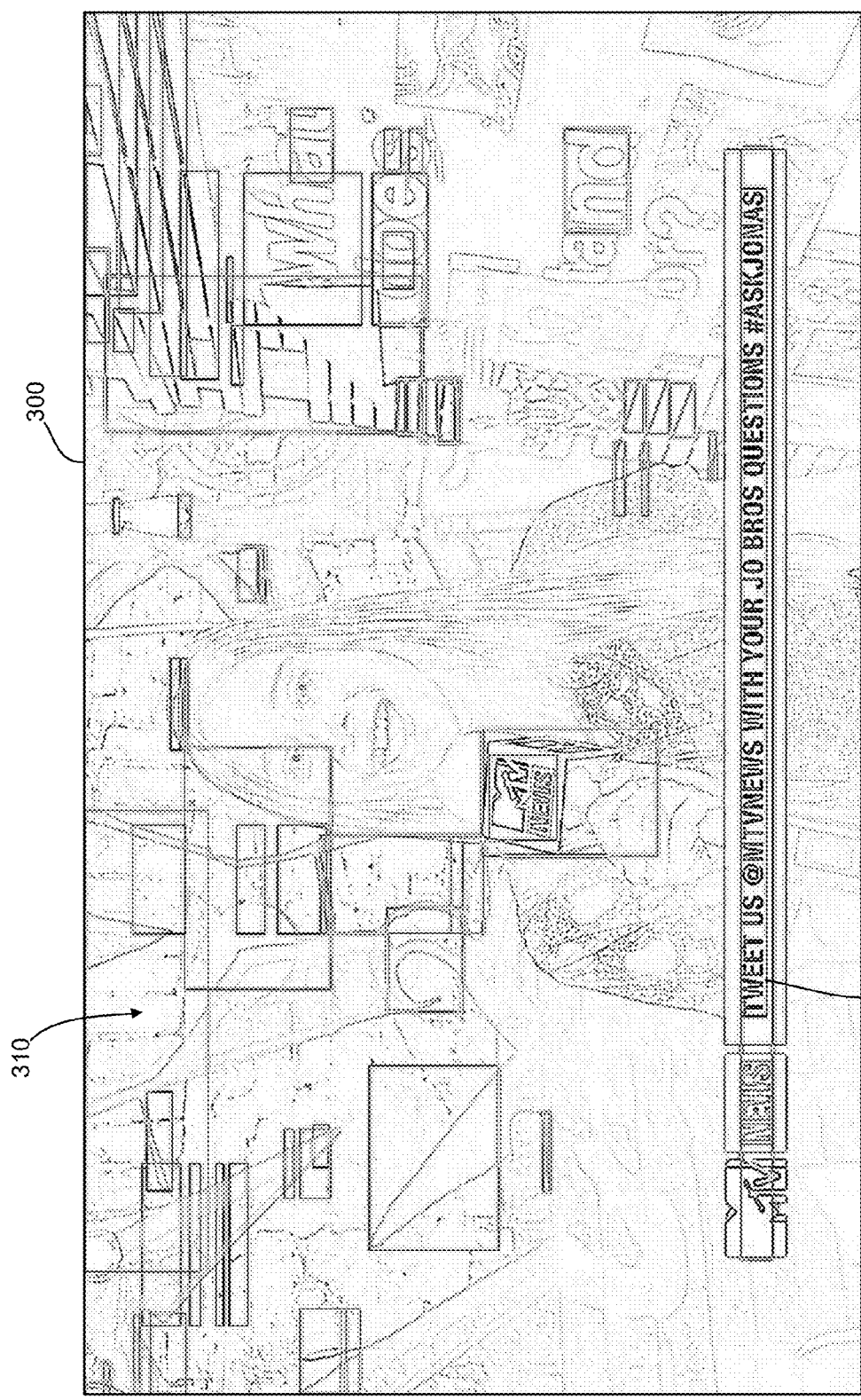
Figure 3E:
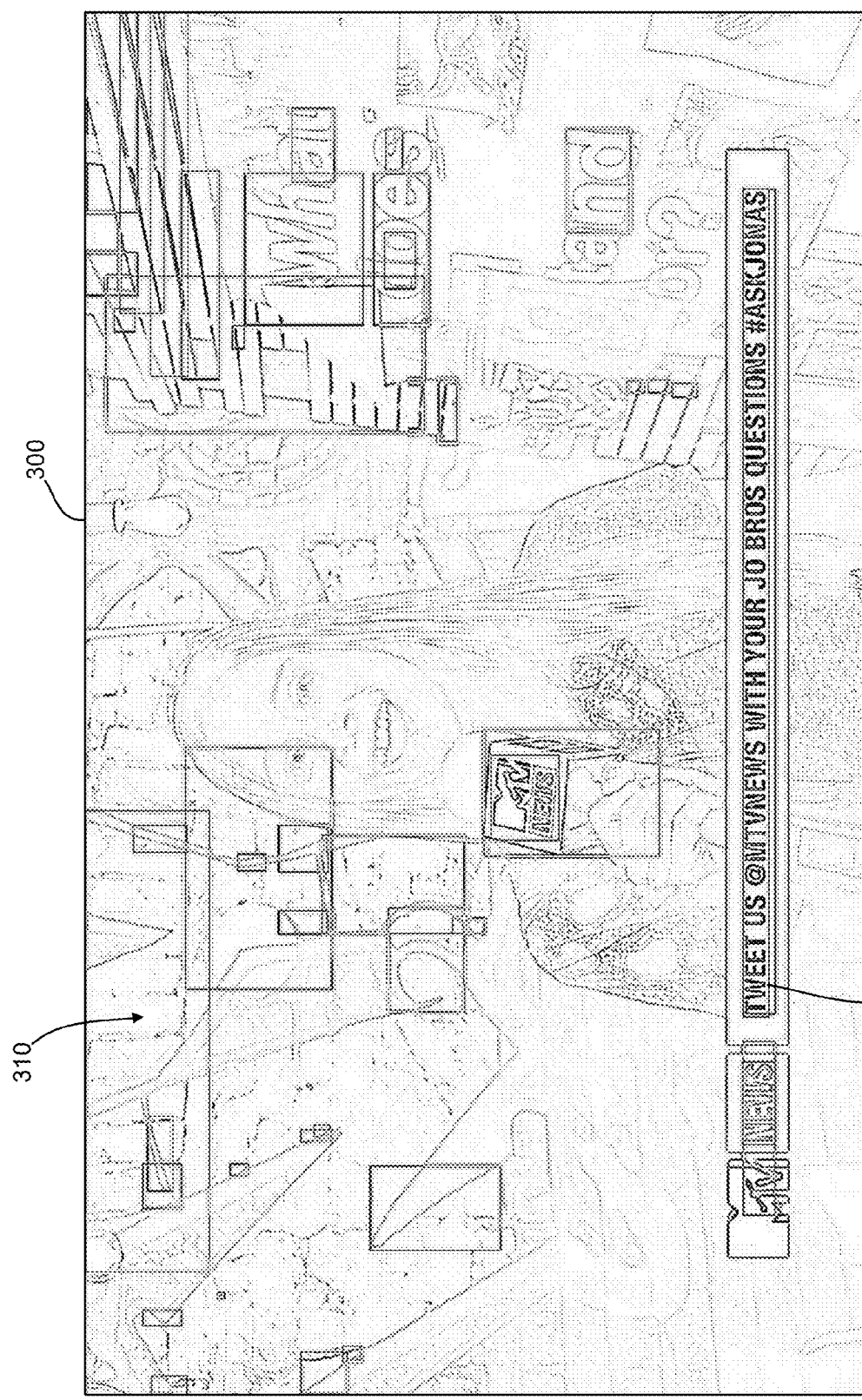

FIG. 3B shows the frame 300 after connected component analysis has been performed. In FIG. 3B, bounding boxes 330 are disposed around the detected connected components. In FIG. 3C, the connected components can be merged into text lines 340. In FIG. 3D, the text lines 340 can be refined using horizontal projections, while in FIG. 3E, the text lines 340 can be refined using vertical projections. This refinement can help break up multiple text lines and eliminate unlikely text lines. The projection of a binary image onto a line can be obtained by partitioning the line into bins and finding the number of 1 pixels that are on lines perpendicular to each bin. Projections are compact representations of images, since much useful information is retained in the projection. Horizontal and vertical projections can be obtained by finding the number of 1 pixels for each bin in the vertical and horizontal directions, respectively.

Figure 3F:
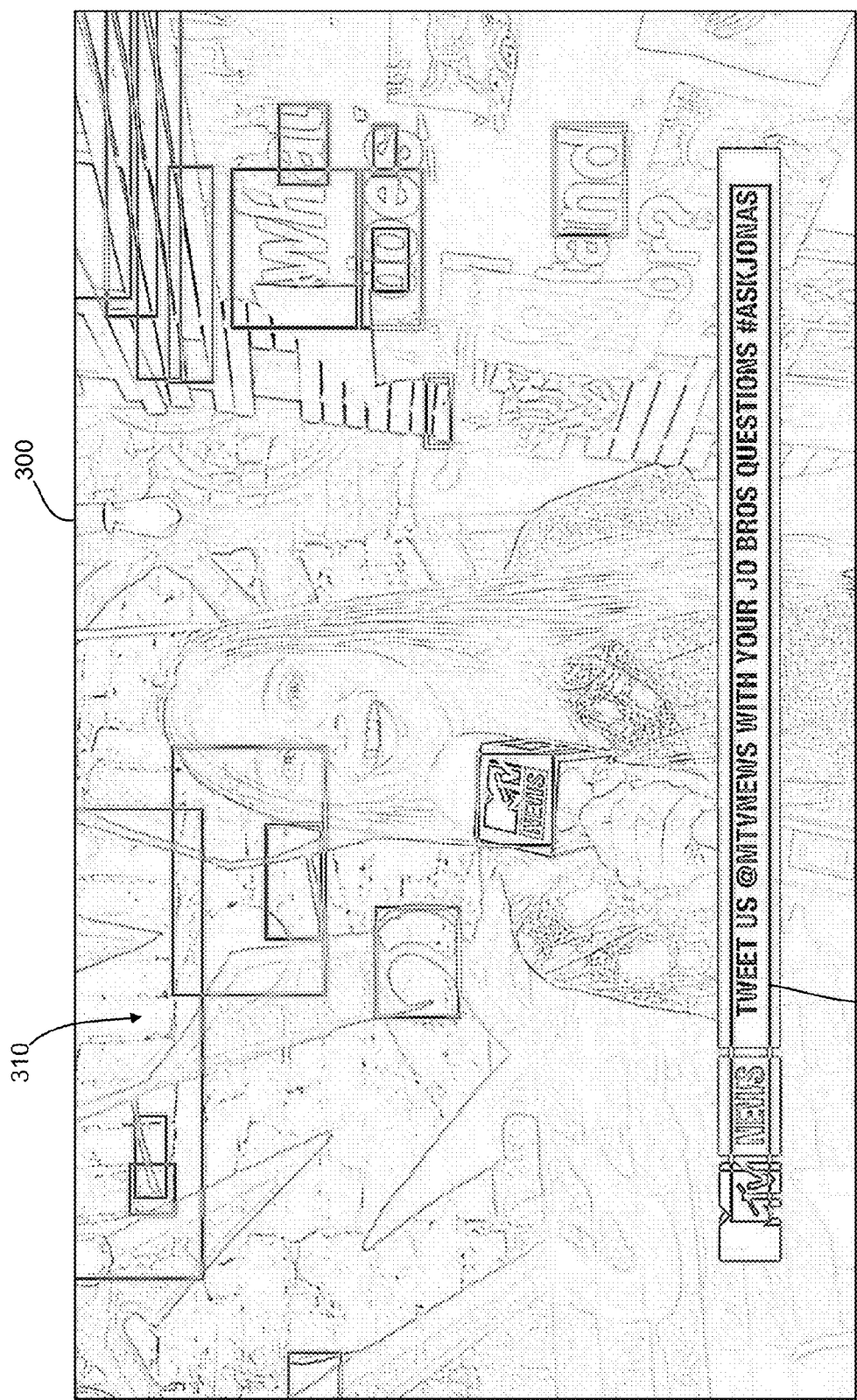
Figure 3G:
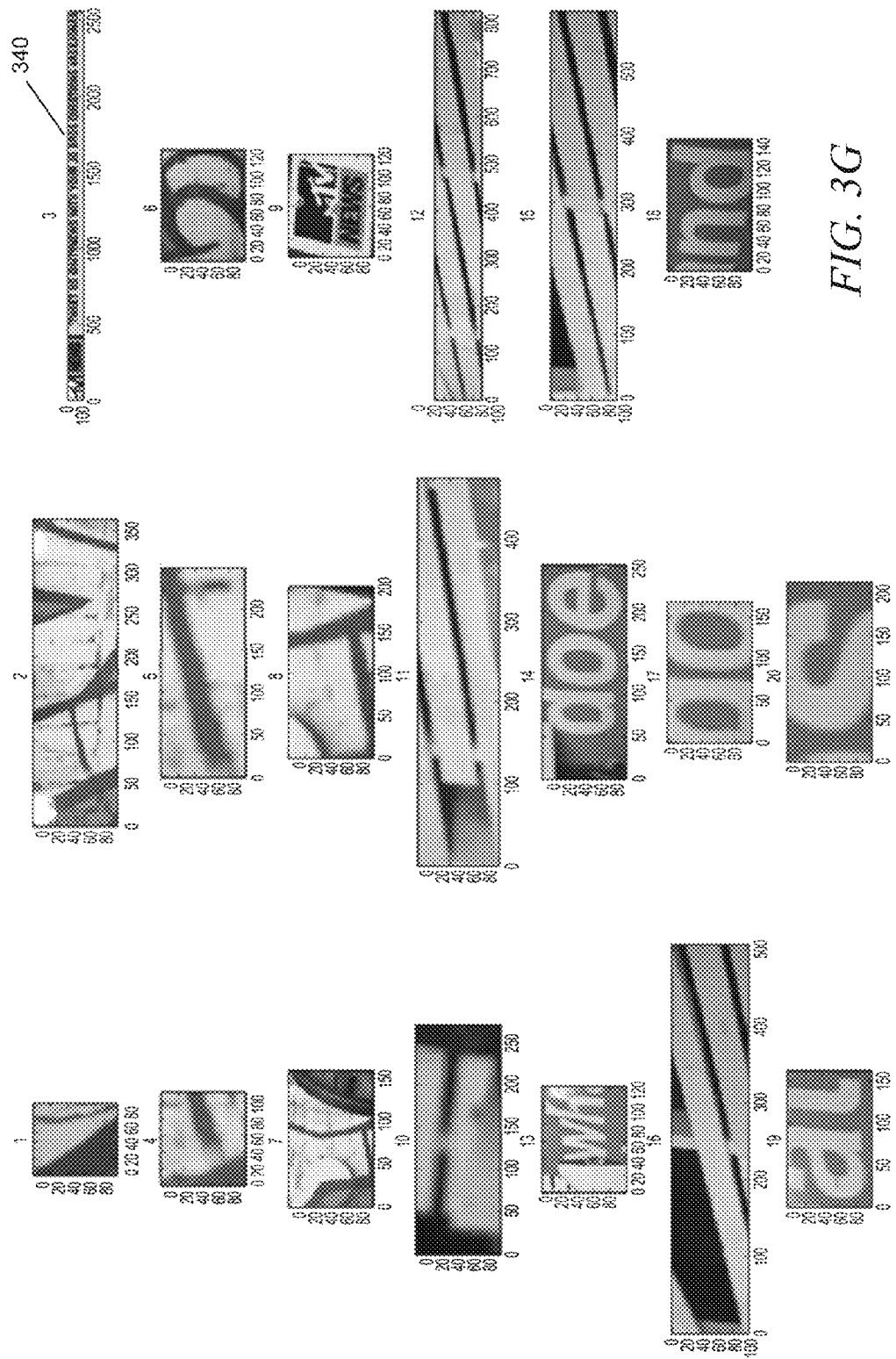
Figure 3H:
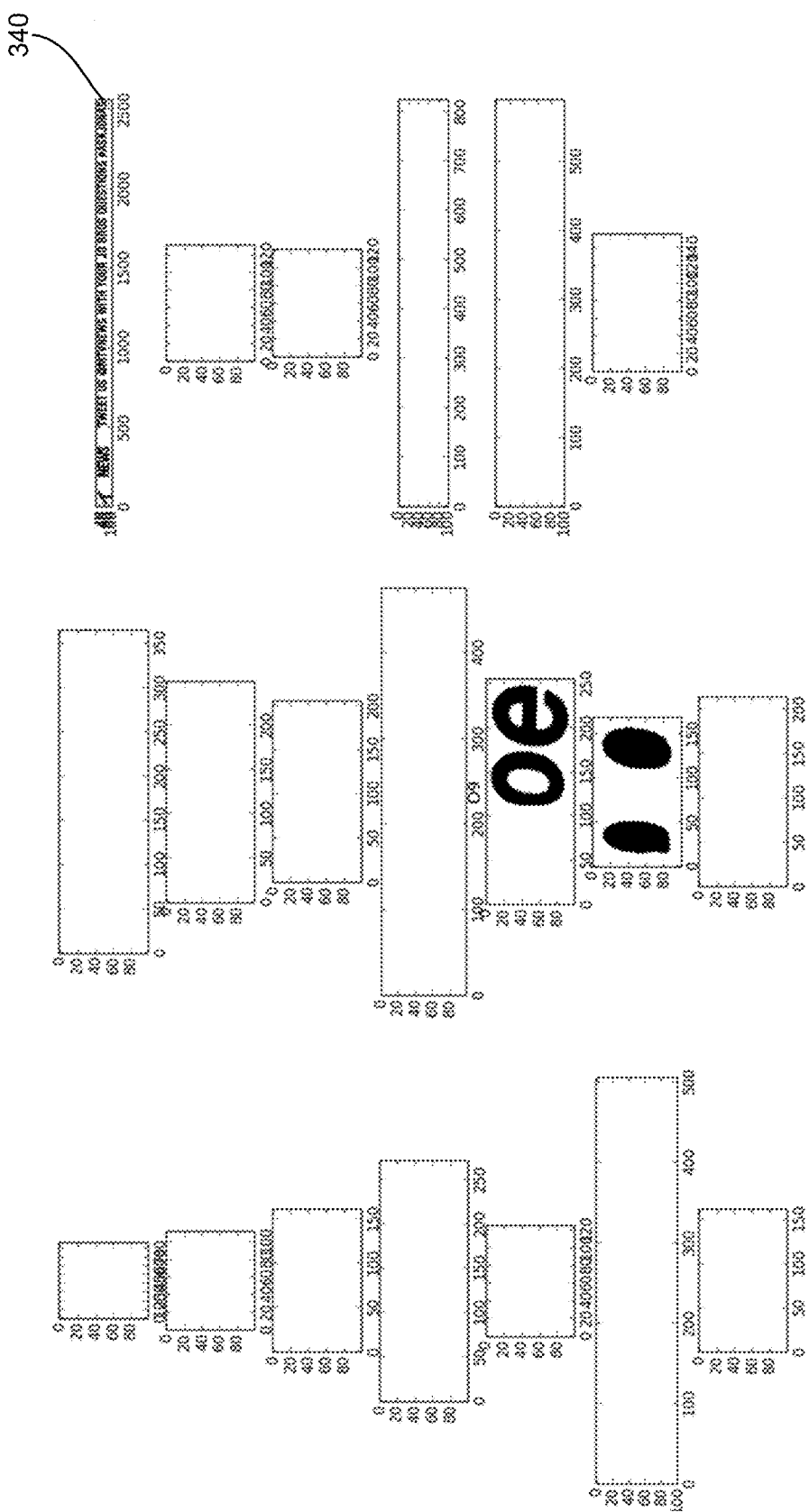

In FIG. 3F, the text lines 340 represent the possible areas that contain text based on their edge information. One or more of the text lines 340 that have been identified so far in the process can be filtered out based on their size. These filtered out text lines are unlikely to contain text (or useful text). A filtered set of likely text lines can thereby be formed. FIG. 3G shows twenty different text lines 340 of frame 300. These twenty different text lines 340 represent the possible areas that contain text based on their edge information. In FIG. 3H, the text lines 340 have been binarized and seventeen of the text lines have been filtered out based on the components of the resulting binarization being unlikely to be letters (e.g., a binarization that results in a mostly black image). The text lines 340 can also be filtered out based on the shape and/or position of their corresponding components, thereby forming the portion of the video content 310 having text.

Figure 3I:
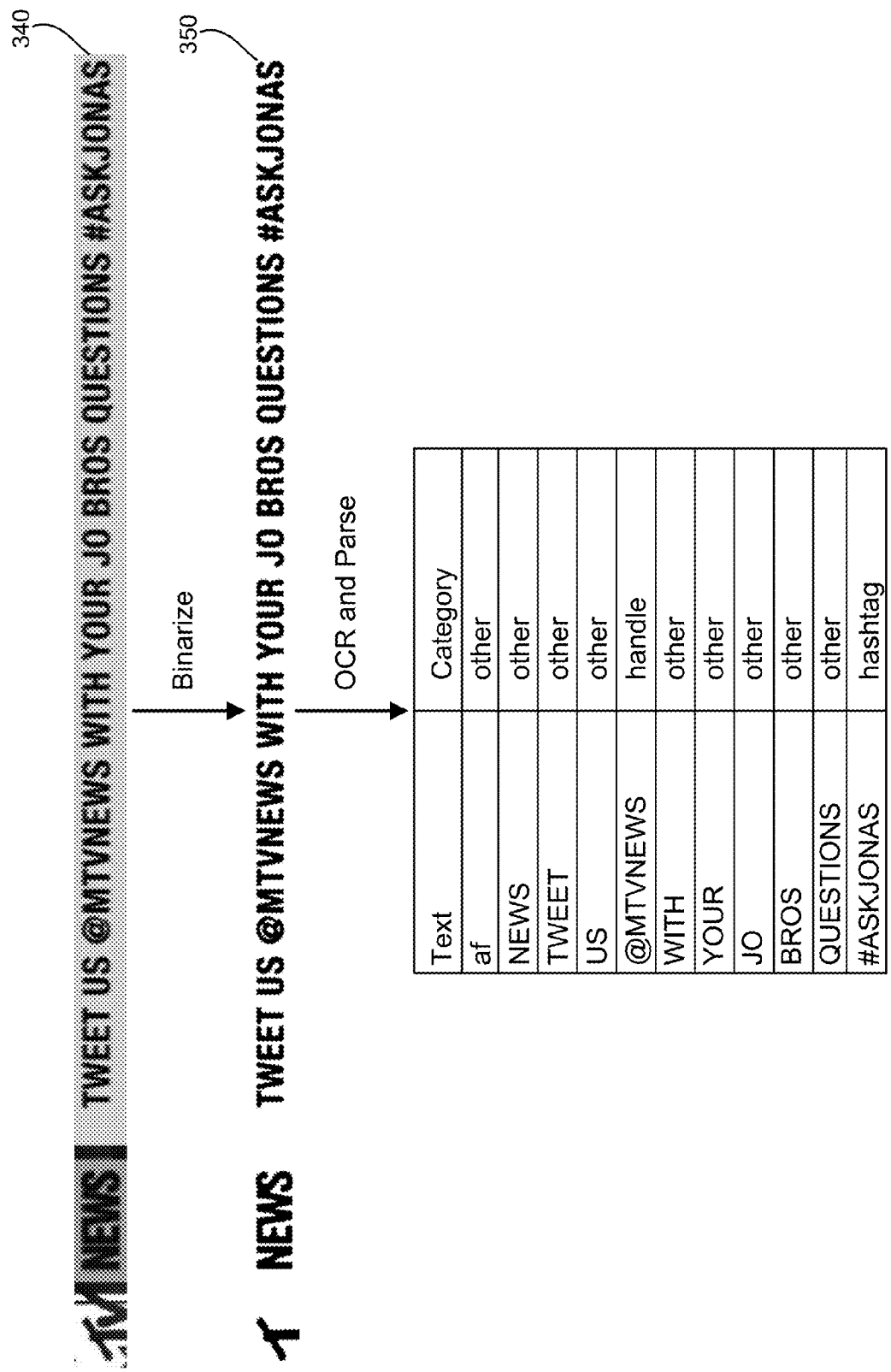

FIG. 3I shows a single text line 340 as the portion of the video content 310 having text. The text line 340 can be binarized, thereby forming a binarized version 350 of the text line 340. Text within the binarized version 350 can be identified by performing OCR on the binarized version 350. The identified text can then be parsed to determine a plurality of text segments. In the resulting table in FIG. 3I, the text segments include: af (the OCR has interpreted the part of the MTV logo as "af"), NEWS, TWEET, US, @MTVNEWS, WITH, YOUR, JO, BROS, QUESTIONS, #ASKJONAS. A corresponding category can be determined for each text segment based on a stored association between the text segment and the category. For example, there can be a stored association between the use of "@" and the category of "handle" (e.g., Twitter® handle). As a result, "@MTVNEWS" can be identified as a "handle." Similarly, there can be a stored association between the use of "#" and the category of "hashtag." As a result, "#ASKJONAS" can be identified as a "hashtag." It is contemplated that these associations can comprise grammar or syntax rules (e.g., using "www." indicates a URL) for determining the appropriate categories and/or can comprise all of (or most of) the text for which a category is being determined (e.g., the text "www.examplewebsite.com" is stored, and the text for which a category is to be determined can be compared with this stored text to determine whether it is a match and should be assigned the same category).

In some embodiments, the determination of a category for text can be used to determine further operations that are performed by the text detection system 100. For example, if text in the video content is identified and categorized as a URL, the text detection system 100 can cause a loading of the URL on a media content device based on the determination of the category as a URL. In another example, if text in the video content is identified and categorized as a phone number, the text detection system 100 can cause a prompting of a user to call the phone number based on the determination of the category as a phone number. Other examples and configurations are also within the scope of the present disclosure.

Additional information can be fetched and aggregated either on the server side (e.g., video content provider 210) or on the client side (e.g., first media content device 220 or second media content device 240). In some embodiments, a corresponding application can be started. Additional information that has been extracted from the detected text can be provided to the application (e.g., a Twitter® handle extracted from text in the video content can be provided to a Twitter® application).

In some situations, identified text and/or its corresponding additional information can fail to correspond to any meaningful use. For example, a specific URL can be determined (e.g., as the additional information) based on text that is identified within video content. However, the loading of the URL in a web browser can fail to result in a corresponding page (e.g., the URL might not exist or have any associated content). In some embodiments, modifications of the detected text and/or additional information (e.g., different spellings and/or symbol combinations of text) can randomly or systematically be attempted by the text detection system 100 in response to, or otherwise based on, a determination that the identified text and/or its corresponding additional information does not satisfy a predetermined threshold of usability (e.g., if the URL is not found by the web browser). These modifications can include, but are not limited to, substrings to account for the text detection system 100 previously pulling in or otherwise using text that did not belong in the identified text and/or in the additional information.

In some embodiments, the text recognition (e.g., OCR) stage can be repeated in response to, or otherwise based on, the determination that the identified text and/or its corresponding additional information does not satisfy a predetermined threshold of usability. This text recognition stage can be repeated to find other likely symbol, letter, and/or numerical combinations or possible errors in the parsing. In some embodiments, if a dictionary was previously used to correct the OCR results during the previous performance of the text recognition stage, then the repeated performance of the text recognition stage can be performed without this dictionary feature, as some letter combinations may be intentionally close to dictionary words, but different (e.g., replacing letters with similar looking numbers, 'E' with '3', 'I' with '1', etc.).

In some embodiments, before providing a URL, handle, or other additional information to a software application for use, the text detection system 100 can perform a verification process on the additional information to ensure that the text recognition was performed correctly. For example, the text detection system 100 can check to make sure that a Facebook® URL or a Twitter® handle are official or correspond to a verified account. The text detection system 100 can use the verification as a condition for providing the additional information to a software application. Other examples and configurations are within the scope of the present disclosure.

In some embodiments, the text detection system 100 can be configured to use a stored history of previously detected and recognized/identified words (or other text) to make corrections to, or otherwise influence, a current text recognition process.

Figure 4:
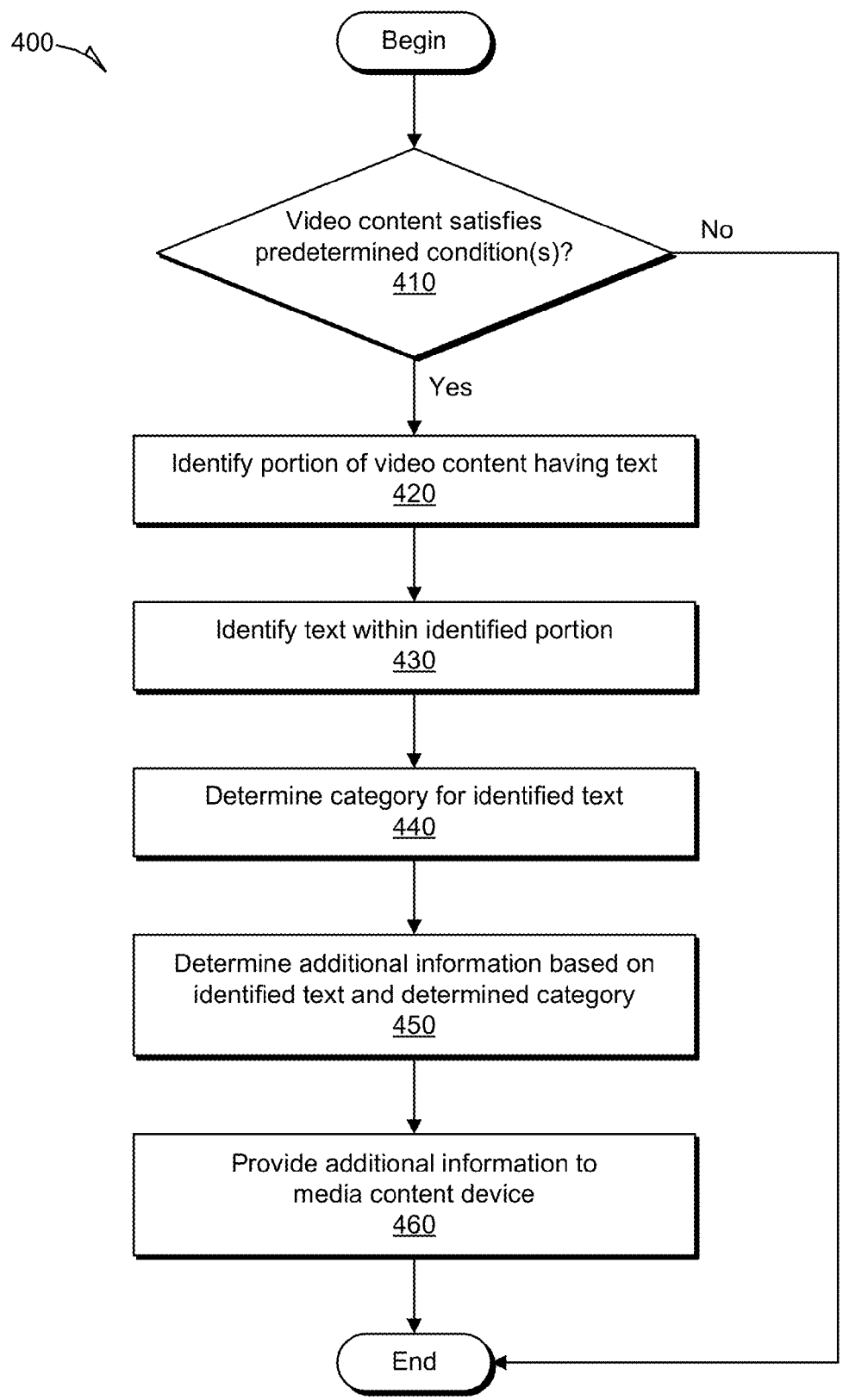
FIG. 4 is a flowchart illustrating a method, in accordance with some example embodiments.

FIG. 4 is a flowchart illustrating a method 400, in accordance with some example embodiments. The operations of method 400 can be performed by a system or modules of a system (e.g., text detection system 100 in FIG. 1). At operation 410, a determination can be made as to whether video content satisfies at least one predetermined condition. In some embodiments, the predetermined condition(s) comprises at least one of a minimum level of clarity, a minimum level of contrast, and a minimum level of content stability across multiple frames. If it is determined that the video content does not satisfy the predetermined condition(s), then the method 400 can come to an end, without the text detection techniques disclosed herein being performed on the video content. If it is determined that the video content does satisfy the predetermined condition(s), then, at operation 420, a portion of video content can be identified as having text. At operation 430, text within the identified portion of the video content can be identified. At operation 440, a category for the identified text can be determined. At operation 450, additional information corresponding to the video content can be determined based on the identified text and the determined category. The additional information can comprise at least one of a uniform resource locator (URL), an identification of a user account, a metadata tag, and a phone number. At operation 460, the additional information can be provided a media content device. The additional information can be provided to a software application on the media content device. The additional information can be caused to be displayed on the media content device. The additional information can be stored in association with the video content or in association with an identified viewer of the video content. The identified text can be stored in association with the video content or in association with an identified viewer of the video content. It is contemplated that the operations of method 400 can incorporate any of the other features disclosed herein.

Figure 5:
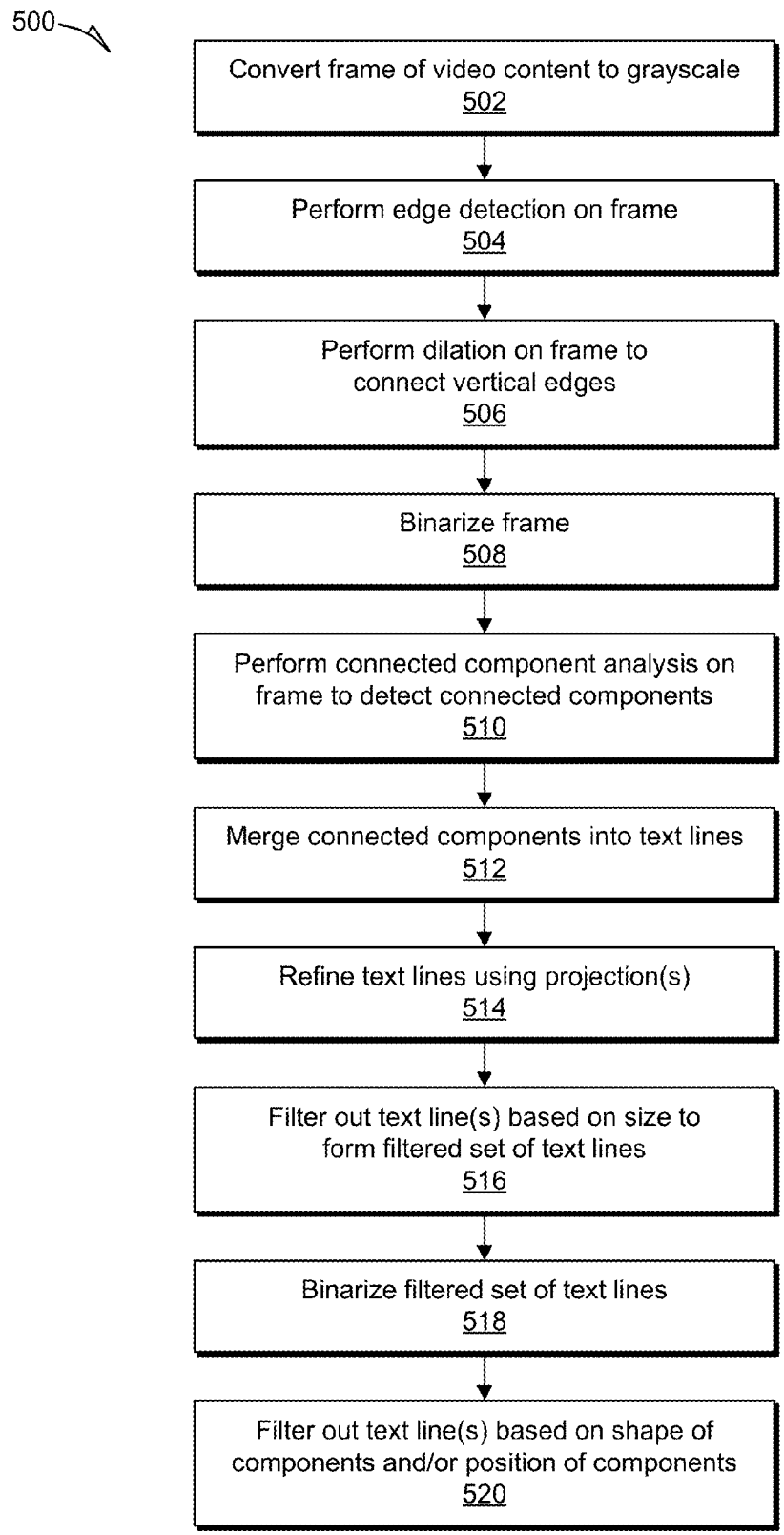
FIG. 5 is a flowchart illustrating a method, in accordance with some example embodiments.

FIG. 5 is a flowchart illustrating a method 500, in accordance with some example embodiments. The operations of method 500 can be performed by a system or modules of a system (e.g., text detection system 100 in FIG. 1). The method 500 can be used to identify the portion of the video content having text. At operation 502, a frame of video content can be converted to grayscale. At operation 504, edge detection can be performed on the frame. At operation 506, dilation can be performed on the frame to connect vertical edges within the frame. At operation 508, the frame can be binarized. At operation 510, a connected component analysis can be performed on the frame to detect connected components within the frame. At operation 512, the connected components can be merged into a plurality of text lines. At operation 514, the plurality of text lines can be refined using horizontal and vertical projections. At operation 516, at least one of the plurality of text lines can be filtered out based on a size of the at least one of the plurality of text lines to form a filtered set of text lines. In some embodiments, operation 516 can be left out of the method 500. For example, if it is determined that all of the text lines meet a predetermined criteria, then this filtering operation 516 can be avoided. At operation 518, the filtered set (or simply the refined set, if the filtering operation 516 is not performed) of text lines can be binarized. At operation 520, at least one of the text lines can be filtered out from the binarized filtered set of text lines based on at least one of a shape of components in the at least one of the text lines and a position of components in the at least one of the text lines to form the portion of the video content having text. It is contemplated that the operations of method 500 can incorporate any of the other features disclosed herein.

Figure 6:
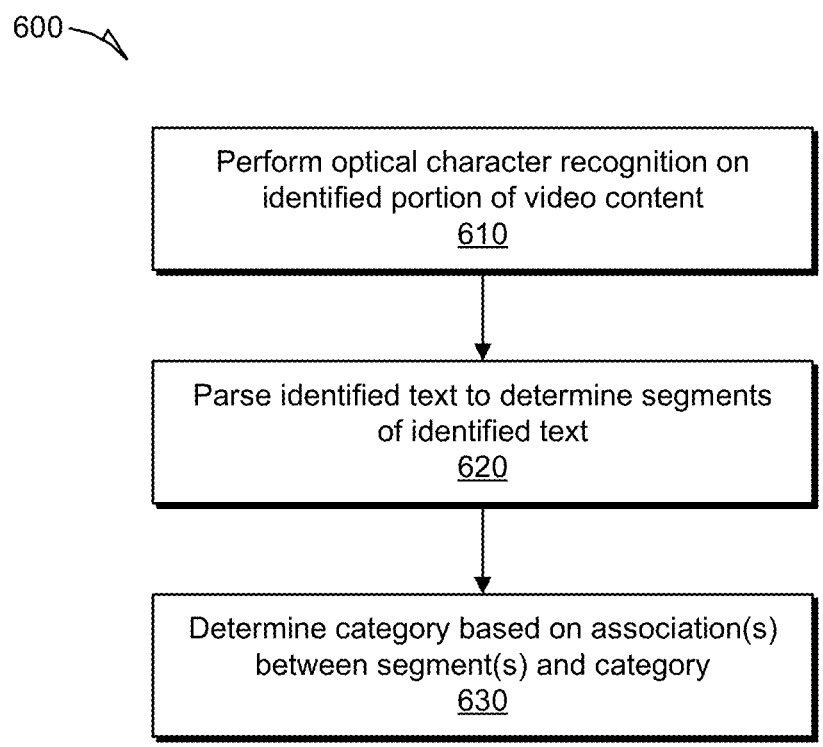
FIG. 6 is a flowchart illustrating a method, in accordance with some example embodiments.

FIG. 6 is a flowchart illustrating a method 600, in accordance with some example embodiments. The operations of method 600 can be performed by a system or modules of a system (e.g., text detection system 100 in FIG. 1). At operation 610, OCR can be performed on an identified portion of video content (e.g., a portion identified as having text) to identify text within the identified portion. At operation 620, the identified text can be parsed to determine a plurality of segments of the identified text. At operation 630, a category can be determined based on a stored association between at least one of the plurality of segments and the category. It is contemplated that the operations of method 600 can incorporate any of the other features disclosed herein.

Example Mobile Device

Figure 7:
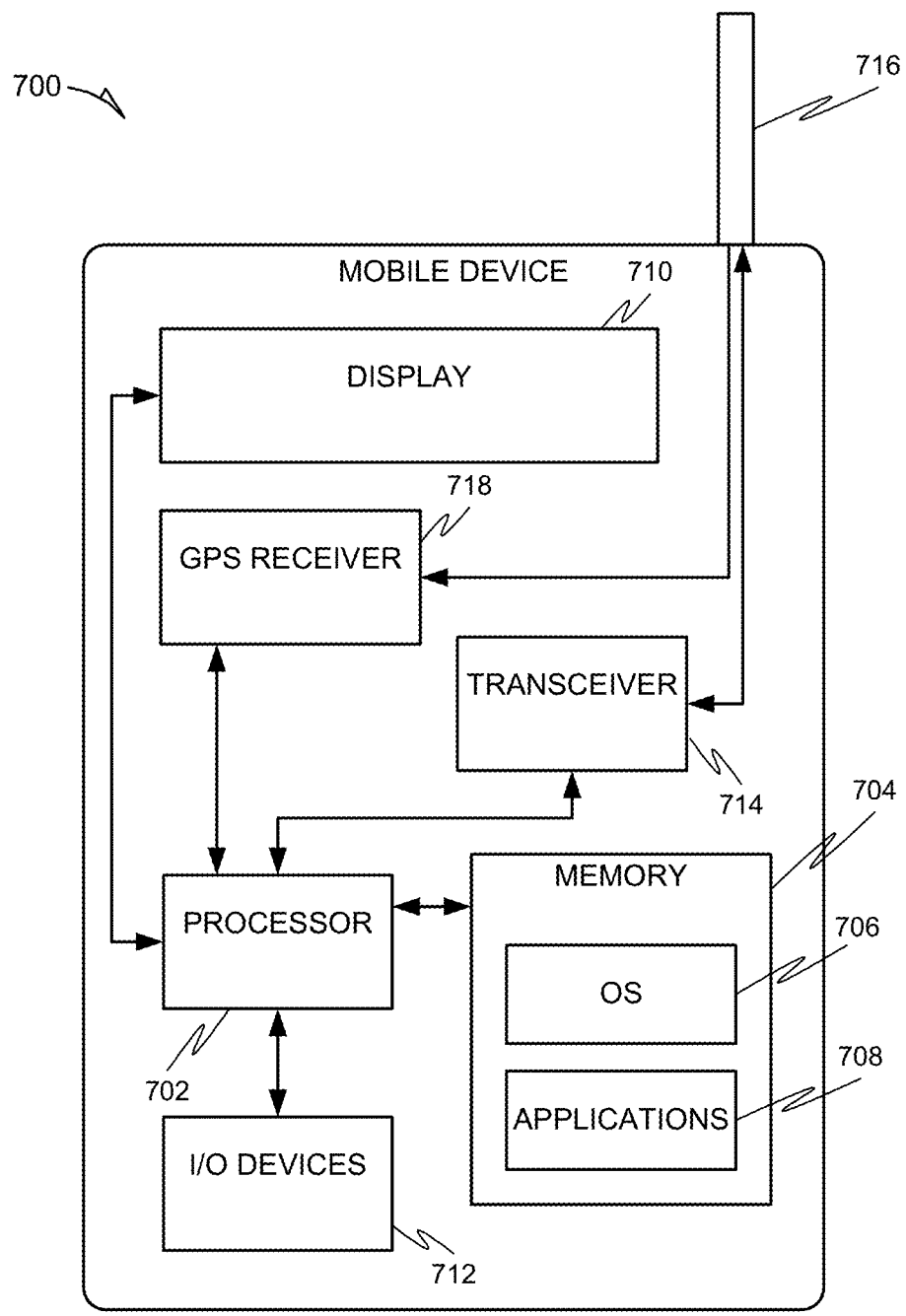
FIG. 7 is a block diagram illustrating a mobile device, in accordance with some example embodiments.

FIG. 7 is a block diagram illustrating a mobile device 700, according to an example embodiment. The mobile device 700 can include a processor 702. The processor 702 can be any of a variety of different types of commercially available processors suitable for mobile devices 700 (for example, an XScale architecture microprocessor, a Microprocessor without Interlocked Pipeline Stages (MIPS) architecture processor, or another type of processor). A memory 704, such as a random access memory (RAM), a Flash memory, or other type of memory, is typically accessible to the processor 702. The memory 704 can be adapted to store an operating system (OS) 706, as well as application programs 708, such as a mobile location enabled application that can provide LBSs to a user. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms. Modules can constitute either software modules (e.g., code embodied on a machine-readable medium or in a transmission signal) or hardware modules. A hardware module is a tangible unit capable of performing certain operations and can be configured or arranged in a certain manner. In example embodiments, one or more computer systems (e.g., a standalone, client, or server computer system) or one or more hardware modules of a computer system (e.g., a processor or a group of processors) can be configured by software (e.g., an application or application portion) as a hardware module that operates to perform certain operations as described herein.

In various embodiments, a hardware module can be implemented mechanically or electronically. For example, a hardware module can comprise dedicated circuitry or logic that is permanently configured (e.g., as a special-purpose processor, such as a field-programmable gate array (FPGA) or an application-specific integrated circuit (ASIC)) to perform certain operations. A hardware module can also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) can be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor can be configured as respective different hardware modules at different times. Software can accordingly configure a processor, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple of such hardware modules exist contemporaneously, communications can be achieved through signal transmission (e.g., over appropriate circuits and buses) that connect the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network and via one or more appropriate interfaces (e.g., APIs).

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 8:
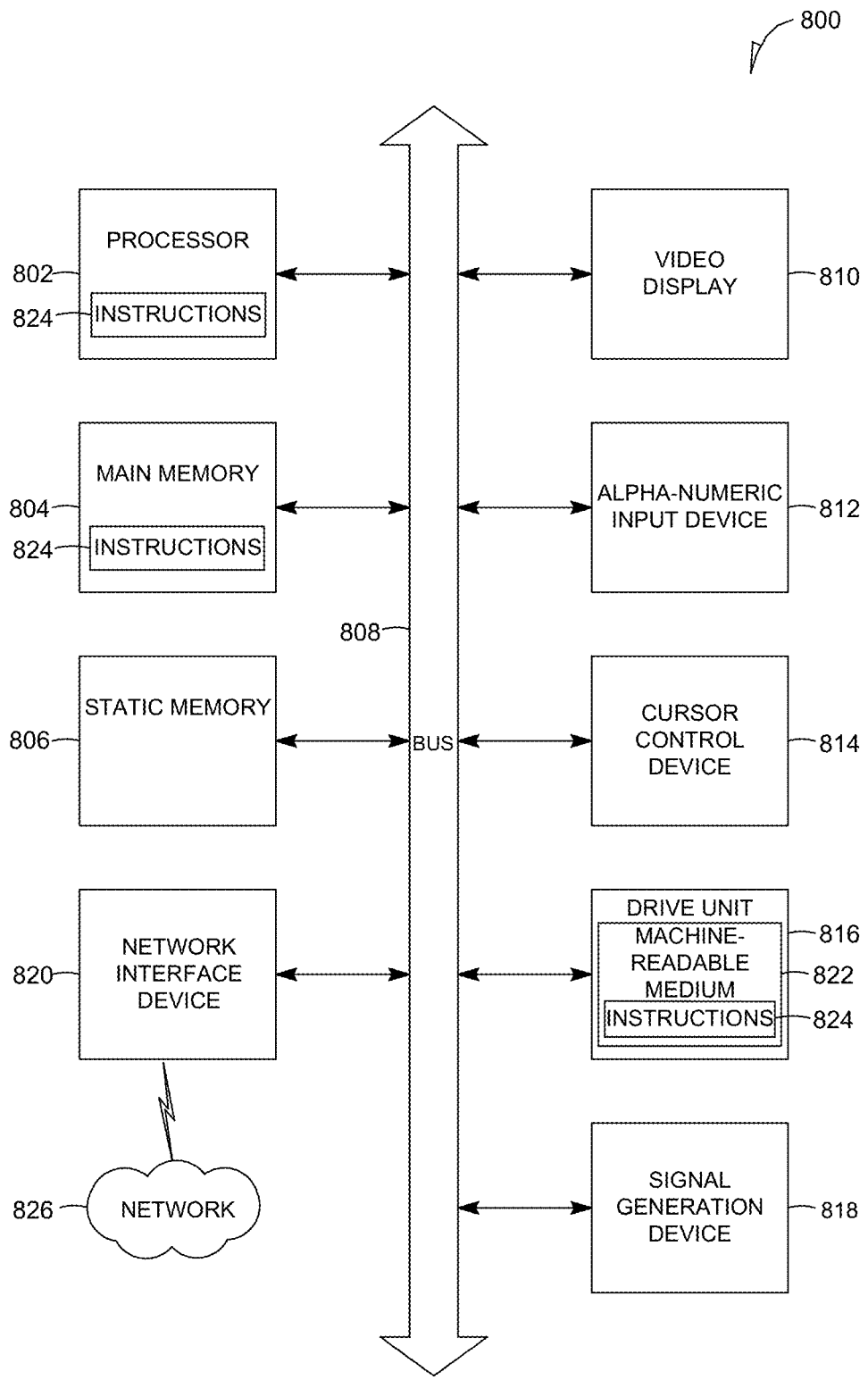
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein can be executed, in accordance with an example embodiment. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a disk drive unit 816, a signal generation device 818 (e.g., a speaker) and a network interface device 820.

The disk drive unit 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media. The instructions 824 can also reside, completely or at least partially, within the static memory 806.

While the machine-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   identifying, by a machine having a memory and at least one processor, a portion of video content as having text, the identifying the portion of the video content comprising:
   performing a connected component analysis on a frame of the video content to detect connected components within the frame;
   merging the connected components into a plurality of text lines;
   refining the plurality of text lines using horizontal and vertical projections in order to remove one or more text lines from the plurality of text lines;
   filtering out at least one of the plurality of text lines based on a size of the at least one of the plurality of text lines to form a filtered set of text lines;
   binarizing the filtered set of text lines formed by the filtering out of the at least one of the plurality of text lines; and
   filtering out at least one of the text lines from the binarized filtered set of text lines based on at least one of a shape of components in the at least one of the text lines and a position of components in the at least one of the text lines to form the portion of the video content having text
   identifying the text within the identified portion of the video content;
   determining a category for the identified text;
   determining additional information corresponding to the video content based on the identified text and the determined category; and
   causing a software application on a media content device to perform a function using the additional information, the function corresponding to the determined category.

2. The method of claim 1, wherein the additional information comprises a uniform resource locator (URL), and causing the software application on the media content device to perform the function comprises causing the URL to be loaded on a browser on the media content device.

3. The method of claim 1, wherein the additional information comprises a phone number, and causing the software application on the media content device to perform the function comprises causing the media content device to provide a prompt to call the phone number.

4. The method of claim 1, further comprising causing the additional information to be displayed on the media content device.

5. The method of claim 1, further comprising storing the additional information in association with the video content or in association with an identified viewer of the video content.

6. The method of claim 1, wherein the additional information comprises at least one of an identification of a user account and a metadata tag.

7. The method of claim 1, wherein the media content device comprises one of a television, a laptop computer, a desktop computer, a tablet computer, and a smartphone.

8. The method of claim 1, further comprising storing the identified text in association with the video content or in association with an identified viewer of the video content.

9. The method of claim 1, wherein identifying the portion of the video content having text further comprises:
converting a frame of the video content to grayscale;
performing edge detection on the frame;
performing dilation on the frame to connect vertical edges within the frame; and binarizing the frame.

10. The method of claim 1, wherein identifying text within the identified portion of the video content comprises performing optical character recognition on the identified portion of the video content.

11. The method of claim 1, wherein determining the category for the identified text comprises:
parsing the identified text to determine a plurality of segments of the identified text; and
determining the category based on a stored association between at least one of the plurality of segments and the category.

12. The method of claim 1, wherein the video content comprises a portion of a television program, a non-episodic movie, a webisode, user-generated content for a video-sharing website, or a commercial.

13. The method of claim 1, wherein the text comprises alphanumeric characters.

14. A system comprising:
a machine having a memory and at least one processor; and
at least one module on the machine, the at least one module being configured to perform operations comprising:
identifying a portion of the video content as having text, the identifying the portion of the video content comprising:
performing a connected component analysis on a frame of the video content to detect connected components within the frame;
merging the connected components into a plurality of text lines;
refining the plurality of text lines using horizontal and vertical projections in order to remove one or more text lines from the plurality of text lines;
filtering out at least one of the plurality of text lines based on a size of the at least one of the plurality of text lines;
binarizing the filtered set of text lines formed by the filtering out of the at least one of the plurality of text lines; and
filtering out at least one of the text lines from the binarized filtered set of text lines based on at least one of a shape of components in the at least one of the text lines and a position of components in the at least one of the text lines to form the portion of the video content having text;
identifying the text within the identified portion of the video content;
determining a category for the identified text;
determining additional information corresponding to the video content based on the identified text and the determined category; and
causing a software application on a media content device to perform a function using the additional information, the function corresponding to the determined category.

15. The system of claim 14, wherein the additional information comprises one of a uniform resource locator (URL) and a phone number, and causing the software application on the media content device to perform the function comprises one of causing the URL to be loaded on a browser on the media content device and causing the media content to provide a prompt to call the phone number.

16. A non-transitory machine-readable storage device, tangibly embodying a set of instructions that, when executed by at least one processor, causes the at least one processor to perform a set of operations comprising:
identifying a portion of the video content as having text, the identifying the portion of the video content comprising:
performing a connected component analysis on a frame of the video content to detect connected components within the frame;
merging the connected components into a plurality of text lines;
refining the plurality of text lines using horizontal and vertical projections in order to remove one or more text lines from the plurality of text lines;
filtering out at least one of the plurality of text lines based on a size of the at least one of the plurality of text lines to form a filtered set of text lines;
binarizing the filtered set of text lines formed by the filtering out of the at least one of the plurality of text lines; and
filtering out at least one of the text lines from the binarized filtered set of text lines based on at least one of a shape of components in the at least one of the text lines and a position of components in the at least one of the text lines to form the portion of the video content having text;
identifying the text within the identified portion of the video content;
determining a category for the identified text;
determining additional information corresponding to the video content based on the identified text and the determined category; and
causing a software application on a media content device to perform a function using the additional information, the function corresponding to the determined category.

17. The method of claim 1, further comprising determining whether the video content satisfies at least one predetermined condition, wherein performing the identifying of the portion of video content as having text is conditioned upon a determination that the video content satisfies the at least one predetermined condition.

18. The method of claim 17, wherein the at least one predetermined condition comprises at least one of a minimum level of clarity, a minimum level of contrast, and a minimum level of content stability across multiple frames.

19. The system of claim 14, the operations further comprising causing the additional information to be displayed on the media content device.

20. The non-transitory machine-readable storage device of claim 16, wherein the additional information comprises one of a uniform resource locator (URL) and a phone number, and causing the software application on the media content device to perform the function comprises one of causing the URL to be loaded on a browser on the media content device and causing the media content to provide a prompt to call the phone number.

* * * * *